I. SNOW.

FEELER MECHANISM FOR LOOMS.

Reissued June 6, 1922. APPLICATION FILED APR. 13, 1922. 15,376.

2 SHEETS—SHEET 1.

Inventor:
Isaac Snow,
by Robt. P. Harris,
Attorney

I. SNOW.

FEELER MECHANISM FOR LOOMS.

Reissued June 6, 1922. APPLICATION FILED APR. 13, 1922. 15,376.

2 SHEETS—SHEET 2.

Inventor:
Isaac Snow
by Robt. P. Harris.
Attorney

UNITED STATES PATENT OFFICE.

ISAAC SNOW, OF LAWRENCE, MASSACHUSETTS, ASSIGNOR TO DRAPER CORPORATION, OF HOPEDALE, MASSACHUSETTS, A CORPORATION OF MAINE.

FEELER MECHANISM FOR LOOMS.

15,376. Specification of Reissued Letters Patent. Reissued June 6, 1922.

Original No. 1,392,806, dated October 4, 1921, Serial No. 379,267, filed May 6, 1920. Application for reissue filed April 13, 1922. Serial No. 553,199.

*To all whom it may concern:*

Be it known that I, ISAAC SNOW, a citizen of the United States, and resident of Lawrence, in the county of Essex and State of Massachusetts, have invented an Improvement in Feeler Mechanisms for Looms, of which the following description, in connection with the accompanying drawings, is a specification, like characters on the drawings representing like parts.

This invention relates to feeler mechanisms for looms, whereby filling is replenished when that in the active shuttle becomes substantially exhausted. Sensitiveness in the feeler is required in order to prevent premature replenishment of filling, and likewise to effect replenishment of filling when that in the shuttle has become substantially exhausted. Among the different types of feeler mechanisms which have been suggested to fulfill the sensitive requirements of a feeler mechanism in use, one consists of a feeler which is moved in a direction longitudinally of the shuttle when the filling is substantially exhausted on a detecting beat, and which is held from such movement by engagement with the filling when a working supply of filling is present in the shuttle on a detecting beat. The present invention is directed more particularly to this type of feeler mechanism, and aims to provide such a feeler mechanism which shall answer the requirements both as to the presence of the working supply of filling in the shuttle, and its substantial absence on a detecting beat.

An important feature of the present invention, therefore, consists of a feeler which is mounted for bodily movement toward and from the front of the loom on a feeler carrier and which has a filling engaging surface that is movable in a direction longitudinally of the shuttle due to the bodily longitudinal movement, such movements being effected when the filling is substantially exhausted on a detecting beat, and prevented by engagement of the feeler with the filling when a working supply is present.

The above and other novel features and combination of parts will be hereinafter described in connection with the accompanying drawings which show one good, practical form of the invention, wherein:—

Figure 1:
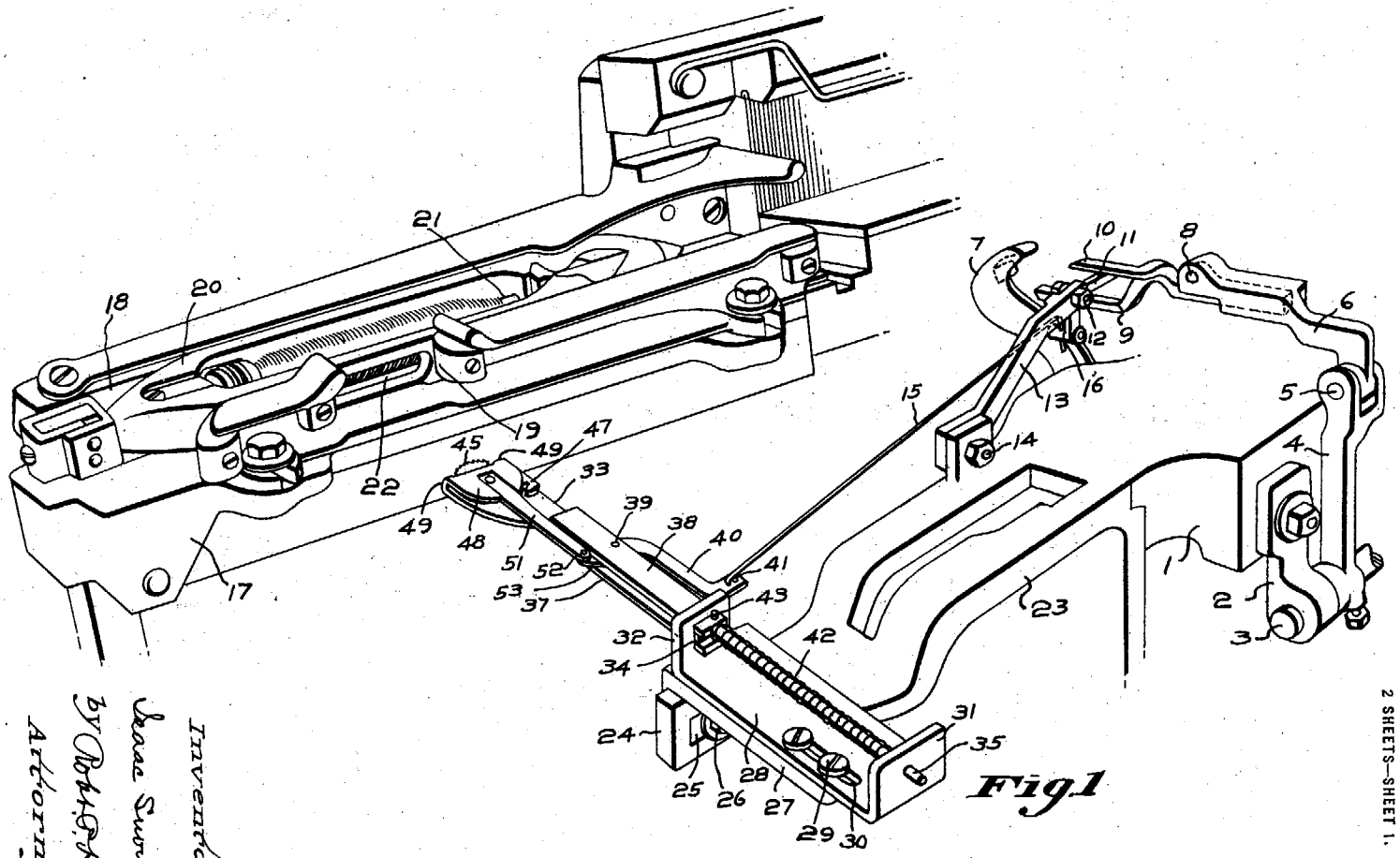
Figure 1 is a perspective view of the feeler side of the loom, showing more particularly the adjacent end of the lay and the feeler mechanism.

The loom frame 1 has mounted thereon the brackets 2, one at each side of the loom, in which is supported the transverse or rock shaft 3 which controls the filling replenishing mechanism, as usual in this class of looms.

Rising from the transverse or rock shaft 3 is the arm 4 to which is pivoted at 5 the latch 6, the rear end portion of which is adapted at times to be engaged by an operating member 7 preferably formed as part of or connected to the cam follower or weft hammer. The latch 6 may be variously formed, but in the present instance it has pivoted thereto at 8, the rear engaging end portion 9 with which the operating member 7 makes contact when the filling is to be replenished. Extending from the portion 9 is a finger 10 which overlies one arm of a bell crank lever 11 pivotally mounted at 12 to a support 13 secured to the loom frame at 14, the construction being such that movement of the bell crank under the control of a transmitter 15 will place the rear end of the engaging portion 9 of the latch in the path of the operating member, as will more fully appear. The transmitter 15 is connected to the bell crank at 16, and the construction of parts so far described is or may be of usual character.

The lay 17 is provided with the usual shuttle-box 18, the front wall of which has an opening 19. The shuttle 20 carries the usual filling wound upon a filling carrier or bobbin 21. The wall of the shuttle is provided with an opening 22 which, when the shuttle is in the detecting box, registers with the opening 19 of the front wall of the shuttle-box for the entrance of the feeler.

Extending from the loom frame is the shipper stand 23 having an arm 24 slotted at 25 for the reception of a bolt 26 which adjustably secures to the arm 24 the bracket 27.

The feeler is mounted on a feeler carrier for movement toward and from the front of the loom. There are different forms of feeler carriers, any one of which might be adapted for the support of the feeler, but in the present instance of the invention the feeler carrier is mounted for reciprocating movement in the feeler stand, as will now be described.

The feeler stand comprises a plate 28 which may be adjustably secured to the bracket 27 by a bolt 29 passing through a slot 30 of the feeler stand. The feeler stand has at its front and rear portions the flanges 31 and 32 respectively, which serve as guides for the feeler carrier. The feeler carrier 33 extends through a slot 34 in the rear flange 32 and has a stem 35 projecting through an opening in the front flange 31, the construction being such that the feeler carrier may be properly guided in its reciprocating movement. The feeler carrier may be conveniently formed as a flat rear portion to which the stem 35 is secured, and in the present instance the feeler carrier, which is designated as a whole by 33, comprises a bottom plate 37 and a spaced upper plate 38, between which plates is pivotally supported at 39 the transmitter actuator 40, to the end of which at 41 is connected the transmitter 15. The stem 35 is secured to and projects frontwardly from the plates 37 and 38 and on the stem 35 is mounted the spring 42, one end of which bears against the front end portions of the plates 37 and 38 and the other end of which bears against the rear face of the flange 31, the construction being such that the spring 42 normally moves the feeler carrier to its rearward position. A stop 43 which may be conveniently provided in the form of a pin, limits the rearward movement of the feeler carrier. The feeler is mounted on the feeler carrier for bodily frontward movement relative thereto, and for movement of its filling engaging surface in a direction longitudinally of the shuttle; and means is provided between the feeler carrier and feeler to effect the bodily movement of the feeler relative to the carrier, due to the movement of the feeler longitudinally of the shuttle under the frontward pressure when the filling is substantially exhausted on a detecting beat. In the present instance of the invention, the feeler 44 is provided with a series of teeth 45 for engaging a surface within the shuttle on a detecting beat, and has a series of teeth 46 which engage the teeth of a fixed rack 47 mounted on the filling engaging surface of the feeler carrier, the construction being such that should the feeler move longitudinally of the shuttle, due to the frontward pressure against the filling-engaging teeth 45, such movement would be accompanied by a bodily frontward movement of the feeler.

Figure 2:
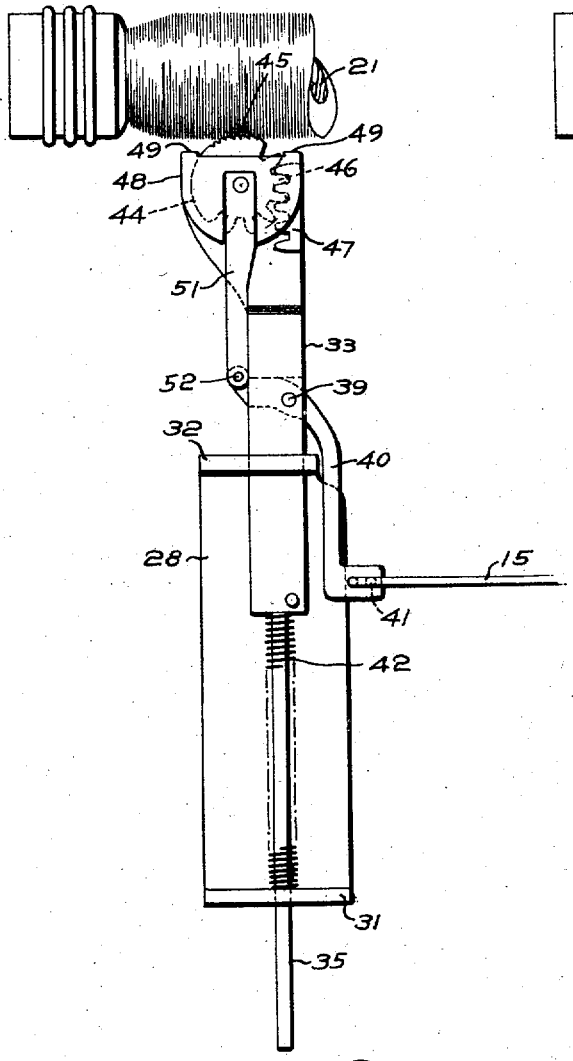
Fig. 2 is a plan view on an enlarged scale, of the feeler mechanism showing its action when a working supply of filling is present in the shuttle on a detecting beat.
Figure 3:
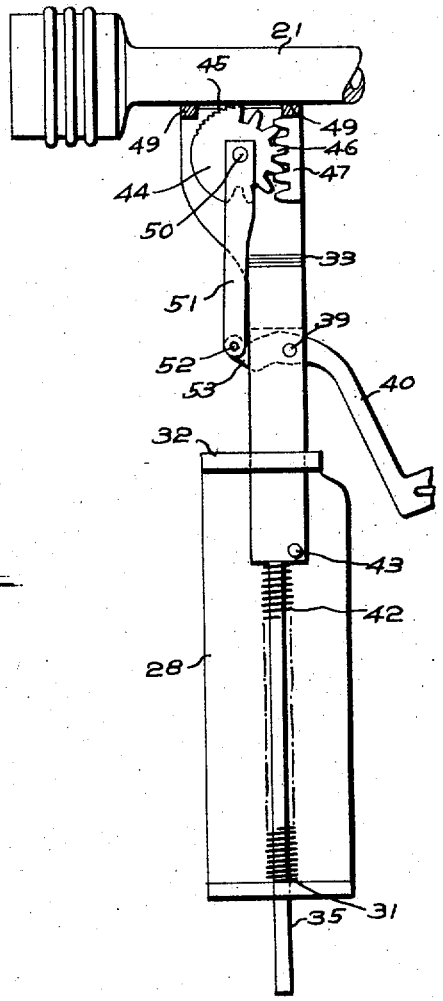
Fig. 3 is a view similar to that of Fig. 2, showing the action of the feeler mechanism when the filling is substantially exhausted on a detecting beat.

The feeler 44 may be conveniently enclosed within a housing 48 on the end of the feeler carrier, and its filling-engaging portion or teeth 45 may project through the housing, as indicated in Figs. 2 and 3, to engage the filling or a surface within the shuttle. At each side of the housing the feeler carrier has the abutting portions 49 which, when the feeler 44 is moved bodily frontward, and in a direction longitudinally of the shuttle, may engage a surface within the shuttle.

The bodily frontward movement of the feeler carrier, which is permitted when the filling-engaging teeth 45 fail to be held from movement longitudinally of the shuttle by the filling on a detecting beat, is advantageously employed in the present instance of the invention to effect replenishment of filling. To this end the feeler 44 has connected thereto at 50, the actuator arm 51 which extends frontwardly and is connected at 52 to the end portion 53 of the transmitter actuator 40, which as hereinbefore described, is pivotally connected to the feeler carrier at 39.

The feeler may be normally held in its rearward feeling position relative to the feeler carrier by suitable means which, in the present instance of the invention, comprises the weight of the latch 6 resting upon the bell crank 11. This of course may be augmented, if desired, by other means, but the sensitiveness of the feeler is such that the weight of the latch is sufficient for ordinary weaving purposes, to hold the feeler in its rearward position.

When a working supply is present in the shuttle on a detecting beat, the engaging teeth 45 of the feeler engage the filling and sink into it so that on further frontward movement of the lay, movement of the filling engaging teeth of the feeler in a direction longitudinally of the shuttle is obstructed by the filling, and consequently bodily frontward movement on the feeler upon the feeler carrier, due to the engaging teeth 46 and rack 47 is prevented, and filling replenishment is not called. When, however, the filling is substantially exhausted on a detecting beat, as indicated in Fig. 3, the engaging teeth 45 of the feeler will no longer be held by the filling from movement longitudinally of the shuttle under the frontward pressure, and the feeler 44 will partake of such movement, with the result that the teeth 46 and rack 47 will effect bodily frontward or rolling movement of the feeler upon the feeler carrier and move the transmitter actuator 40 from the position indicated in Fig. 2 to that indicated in Fig. 3, and effect replenishment of filling by placing the end of the latch 6 in the path of the operating member 7.

What is claimed is:

1. In a feeler mechanism for looms, the combination of a feeler carrier mounted for movement toward and from the front of the loom, a rack which is fixed relative to the feeler carrier, a feeler that is mounted on the feeler carrier for bodily movement frontward relative thereto and for movement in a direction longitudinally of the shuttle and which is held from such movements by engagement with the filling on a detecting beat until the filling is substantially exhausted, and rack teeth on the feeler which engage the fixed rack on the feeler carrier.

2. In a feeler mechanism for looms, the combination of a feeler carrier mounted for movement toward and from the front of the loom, a feeler that is mounted on the feeler carrier for rotative movement relative to the longitudinal axis of the shuttle and for bodily movement in a frontward direction relative to the feeler carrier and that is held from said movements by engagement with the filling on a detecting beat until substantial exhaustion thereof, and means for effecting replenishment of filling when the feeler is rotated and moved bodily relative to the feeler carrier.

3. In a feeler mechanism for looms, the combination of a feeler carrier mounted for movement towards and from the front of the loom, a feeler mounted for movement relative to the carrier in two directions, one a turning movement relative to the longitudinal axis of the shuttle due to the frontward pressure upon the feeler when the filling is substantially exhausted on a detecting beat and the other a bodily movement relative to the carrier which is dependent upon the turning movement, and means for effecting replenishment of filling when the feeler partakes of such movements on a detecting beat.

4. In a feeler mechanism for looms, the combination of a feeler carrier, a feeler mounted on the feeler carrier for rotative movement relative to the longitudinal axis of the shuttle and held from such movement by the filling on a detecting beat until the filling is substantially exhausted, connections between the feeler and feeler carrier which effect bodily frontward movement of the feeler relative to the carrier due to the rotative movement of the feeler, and means operated by frontward bodily movement of the feeler relative to the feeler carrier for effecting replenishment of filling.

5. In a feeler mechanism for looms, the combination of a feeler carrier, a feeler mounted on the feeler carrier for movement of its filling engaging surface longitudinally of the shuttle and held from such movement by the filling on a detecting beat until the filling is substantially exhausted, connections between the feeler and feeler carrier comprising teeth on the feeler and a rack on the feeler carriage, which effect bodily frontward movement of the feeler relative to the carrier due to the movement of the filling engaging teeth of the feeler longitudinally of the shuttle, and means operated by frontward bodily movement of the feeler relative to the feeler carrier for effecting replenishment of filling.

6. In a feeler mechanism for looms, the combination of a feeler carrier having a housing, feeder mounted within the housing for movement bodily therein and for rotative movement relative to the longitudinal axis of the shuttle by the frontward pressure and held from such movements by engagement with the filling on a detecting beat until substantial exhaustion of filling, connections between the feeler and feeler carrier for causing bodily frontward movement of the feeler relatively to the feeler carrier when it is rotated, relative to the longitudinal axis of the shuttle on a detecting beat and means for effecting replenishment of filling.

7. In a feeler mechanism, the combination of a feeler carrier, a feeler mounted for rotative movement and rack and pinion connection between the feeler and feeler carrier for converting the rotative movement of the feeler into a rolling movement relative to the feeler carrier, and filling engaging teeth for holding the feeler from moving relative to the carrier until filling is substantially exhausted.

8. In a feeler mechanism for looms, the combination of a feeler carrier mounted for movement toward and from the front of the loom, a feeler which is mounted for rotative movement relative to the longitudinal axis of the shuttle and frontward bodily movement relative to the carrier by the frontward pressure of a surface within the shuttle on a detecting beat when the filling is substantially exhausted, and means connected to the feeler for effecting replenishment of filling when the feeler is so moved on a detecting beat.

9. A feeler mechanism comprising in combination, a feeler carrier, a rack secured to the carrier, a feeler having rack teeth engaging the fixed and filling engaging teeth for engaging the filling in the shuttle, and means for normally holding the feeler in feeling position and movable by the feeler when the cooperating teeth of the feeler and rack cause frontward movement of the feeler due to the filling engaging teeth moving along the filling carrier on a detecting beat.

10. In a feeler mechanism for looms, the combination of a feeler carrier, a feeler mounted to roll bodily along the feeler carrier towards and from the front of the loom, filling engaging teeth for holding the feeler on a detecting beat from said rolling movement until filling is substantially exhausted, and means for effecting replenishment of filling when said rolling movement is imparted to the feeler.

11. In a feeler mechanism for looms, the combination of a feeler carrier, a feeler mounted to have a rolling movement imparted thereto by frontward pressure upon the feeler to roll the feeler along the feeler carrier, and teeth upon the feeler to engage the filling upon a detecting beat and hold the feeler from said rolling movement until filling is substantially exhausted.

In testimony whereof, I have signed my name to this specification.

ISAAC SNOW.